United States Patent
Ai

(10) Patent No.: US 9,066,196 B2
(45) Date of Patent: Jun. 23, 2015

(54) METHOD AND DEVICE FOR SAVING NETWORK RESOURCES

(75) Inventor: Ming Ai, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 176 days.

(21) Appl. No.: 13/701,203

(22) PCT Filed: Sep. 19, 2011

(86) PCT No.: PCT/CN2011/079799
§ 371 (c)(1),
(2), (4) Date: Nov. 30, 2012

(87) PCT Pub. No.: WO2012/055306
PCT Pub. Date: May 3, 2012

(65) Prior Publication Data
US 2013/0083765 A1 Apr. 4, 2013

(30) Foreign Application Priority Data
Oct. 26, 2010 (CN) .......................... 2010 1 0527247

(51) Int. Cl.
*H04W 4/00* (2009.01)
*H04W 48/18* (2009.01)
*H04W 76/02* (2009.01)

(52) U.S. Cl.
CPC .............. *H04W 4/005* (2013.01); *H04W 48/18* (2013.01); *H04W 76/02* (2013.01)

(58) Field of Classification Search
CPC .......................... H04W 4/005; H04W 74/0833
See application file for complete search history.

(56) References Cited

U.S. PATENT DOCUMENTS

| 2004/0127237 A1 | 7/2004 | Hurtta |
| 2005/0141471 A1 | 6/2005 | Virtanen et al. |
| 2011/0299492 A1* | 12/2011 | Lee et al. ...................... 370/329 |

FOREIGN PATENT DOCUMENTS

| CN | 1545237 | 11/2004 |
| CN | 101483932 | 7/2009 |

OTHER PUBLICATIONS

International Search Report for PCT International Application No. PCT/CN2011/079799 dated Dec. 22, 2011 (including English translation).
"3rd Generation Partnership Project; Technical Specification Group Services and System Aspects; General Packet Radio Service (GPRS) enhancements for Evolved Universal Terrestrial Radio Access Network (E-UTRAN) access (Release 10)", 3GPP Standard; 3GPP TS 23.401, 3rd Generation Partnership Project (3GPP), Mobile Competence Centre ; 650, Route Des Lucioles; F-06921 Sophia-Antipolis Cedex; France, No. V10.1.0, Sep. 29, 2010, pp. 1-271, XP050442333 [retrieved on Sep. 29, 2010].

(Continued)

*Primary Examiner* — Fan Ng
(74) *Attorney, Agent, or Firm* — Foley & Lardner LLP

(57) ABSTRACT

The present application provides a method and a device for saving network resources, wherein the method particularly includes: determining that a user equipment has the property of small data amount transfer; and during network attachment, allocating no user plane resources to the user equipment which has the property of small data amount transfer. The present application is used to save network resources in an LTE system during M2M communication.

14 Claims, 4 Drawing Sheets

Determine that a user equipment has the characteristic of small data transmission — 101

Allocate no user plane resource to the user equipment with the characteristic of small data transmission in a network attachment procedure — 102

(56) References Cited

OTHER PUBLICATIONS

"3rd Generation Partnership Project; Technical Specification Group Services and System Aspects; System Improvements for Machine-Type Communications; (Release 10)", 3GPP Standard; 3GPP TR 23.888, 3rd Generation Partnership Project (3GPP), Mobile Competence Centre ; 650, Route Des Lucioles; F-06921 Sophia-Antipolis Cedex; France, V1.0.0, Sep. 22, 2010, pp. 1-80, XP050442131 [retrieved on Sep. 22, 2010].

Supplementary European Search Report for EP 11835579.1 dated Jun. 28, 2013.

ZTE: "MTC specific congestion/overload control description in Attach and Service Request procedures", 3GPP Draft; S2-104524, 3rd Generation Partnership Project (3GPP), Mobile Competence Centre; 650, Route Des Lucioles; F-06921 Sophia-Antipolis Cedex; France, vol. SA WG2, Prague; 20101011, Oct. 5, 2010, XP050459364, [retrieved on Oct. 5, 2010].

ZTE: "Clarification on Low Priority Usage for MTC", 3GPP Draft; S2-104525, 3rd Generation Partnership Project (3GPP), Mobile Competence Centre ; 650, Route Des Lucioles; F-06921 Sophia-Antipolis Cedex; France, vol. SA WG2, No. Prague; 20101011, Oct. 5, 2010, XP050459365, [retrieved on Oct. 5, 2010].

"Network Improvements for Small Data Transmission," 3GPP TSG SA WG2 Meeting #78, Feb. 22-26, 2010, San Francisco, USA.

Examination Report for European Patent Application No. 11 835 579.1 mailed Sep. 17, 2014.

* cited by examiner

METHOD AND DEVICE FOR SAVING NETWORK RESOURCES

This application is a US National Stage of International Application No. PCT/CN2011/079799, filed Sep. 19, 2011, designating the United States, and claiming the benefit of Chinese Patent Application No. 201010527247.0, filed with the Chinese Patent Office on Oct. 26, 2011 and entitled "Method and system for saving network resource", both of which are hereby incorporated by reference in their entireties.

FIELD

The present invention relates to the field of communication technologies and particularly to a method and apparatus for saving a network resource.

BACKGROUND

A characteristic in the $3^{rd}$ Generation Partnership Project (3GPP) Machine to Machine (M2M) communication specification is small data transmission, for example, it is only necessary to transfer small amount of data between a Machine Type Communication (MTC) terminal and an MTC server.

In view of this characteristic of small data transmission, existing network optimization methods are as follows:

A1. The small data is transferred in a short message, where the short message can be transferred via an SGs interface between a Mobility Management Entity (MME) and a Mobile Switching Center (MSC)/a Visitor Location Register (VLR); and A2. Data is transmitted along with a signalling message to an MME/SGSN (Serving GPRS Support Node) or other mobility management entities, and the MME/SGSN forwards the data directly to an MTC server, and at this time a new interface will be introduced between the MME/SGSN and the MTC server.

In a Long Term Evolution (LTE) system, a User Equipment (UE) has to establish its Packet Data Network (PDN) connection to a default Access Point Name (APN) in an attach-to-network procedure. Resources of network nodes, e.g., resources at an evolved Node B (eNB), an MME, a Serving Gateway (SGW), a Packet Data Network (PDN) Gateway (PGW), etc., will be occupied after this PDN connection is established. These resources generally include a storage resource at a network node, the identifier of a tunnel of a user plane connection and other user plane resources. The LTE system is designed as such from the perspective of the characteristic of "Always-On" to ensure that the UE can establish a connection required for communication so long as the UE is attached to the LTE network, so a user can communication conveniently and rapidly.

Since the small amount of data is transmitted along with a signalling message, i.e., on a signalling plane, in both of the foregoing methods A1 and A2, the small data is transmitted without using any user plane resource. In view of such a characteristic that there are a very large number of MTC terminals in M2M communication and transmission of only small data is required for the majority of the MTC terminals, a considerable waste of network resources will inevitably result if PDN connections are established for the large number of MTC terminals on the LTE network but are not used in practical communication.

In general, it is highly desirable for those skilled in the art to address a technical problem of how to alleviate a waste of network resources under the foregoing circumstance.

SUMMARY

An aspect of the invention is to provide a method and apparatus for saving a network resource so as to save a network resource in M2M communication of an LTE system.

In order to address the foregoing problem, the invention discloses a method for saving a network resource, which includes:

determining that a user equipment has the characteristic of small data transmission; and allocating no user plane resource to the user equipment with the characteristic of small data transmission in a network attachment procedure.

The invention further provides another method for saving a network resource, which includes:

a Serving Gateway, SGW, receiving an indicator, of no bearer being required to be established, from a Mobility Management Entity, MME, for a user equipment with the characteristic of small data transmission; and the SGW allocating a null resource to a Packet Data Network, PDN, connection and transmitting a Create Session Request message, carrying the indicator of no bearer being required to be established, to a Packet Data Gateway, PGW, to instruct the PGW to allocate a null resource to the PDN connection.

The invention further provides another method for saving a network resource, which includes:

a Packet Data Gateway, PGW, receiving an indicator, of no bearer being required to be established, transmitted from a Serving Gateway, SGW, for a user equipment with the characteristic of small data transmission; and the PGW allocating a null resource to a Packet Data Network, PDN, connection and returning a Create Session Response message to the SGW.

The invention further provides another method for saving a network resource, which includes:

an evolved Node B, eNB, receiving an indicator of a null resource transmitted from a Mobility Management Entity, MME, for a user equipment with the characteristic of small data transmission; and the eNB allocating no user plane resource to the user equipment.

The invention has the following advantages over the prior art:

With the invention, no user plane resource is allocated to a user equipment with the characteristic of small data transmission in a network attachment procedure; and there are a large number of user equipments with the characteristic of small data transmission in 3GPP M2M commutation, so the invention can significantly save user plane resources to thereby enable a larger number of user equipments to access a network.

DETAILED DESCRIPTION OF THE EMBODIMENTS

The invention will be further described in details below with reference to the drawings and embodiments thereof in order to make the foregoing aspect, features and advantages of the invention become more apparent.

A core idea of the embodiments of the invention lies in that no user plane resource is allocated to a user equipment with the characteristic of small data transmission in a network attachment procedure to thereby save a network resource, thus enabling a larger number of user equipments to access a network.

Figure 1:
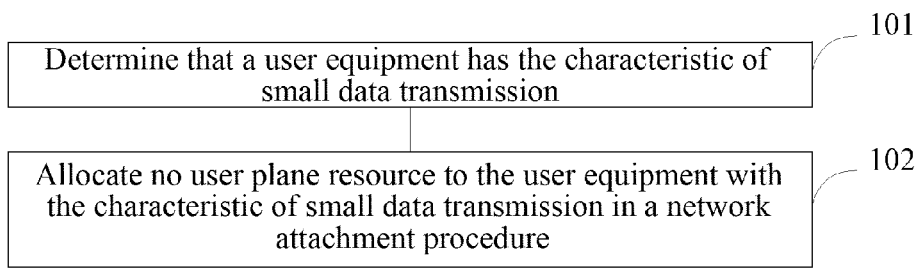
FIG. 1 is a flow chart of a first embodiment of a method for saving a network resource according to the invention.

Referring to FIG. 1 illustrating a flow chart of a first embodiment of a method for saving a network resource according to the invention, the method may particularly include:

an operation 101 to determine that a user equipment has the characteristic of small data transmission.

The invention can be applicable to M2M communication of an LTE system in order to accommodate the characteristic of small data transmission of the user equipment on the precondition of saving a network resource.

In practice, the user equipment may be a UE, an MTC terminal, etc., and the invention will not be limited to any specific user equipment. The following description will be given taking a UE as an example and can also apply to other user equipments.

For a UE which has subscribed for only the characteristic of small data transmission, it can be known directly from subscription data of the UE that the UE has subscribed for the characteristic of small data transmission, and thus it is determined that the UE has the characteristic of small data transmission. In practice, a Home Subscriber Server (HSS) generally stores the subscription data of the UE.

However numerous UEs have subscribed for both the characteristic of small data transmission and another characteristic or characteristics which may include a resource characteristic of setting up a PDN connection, for example, the characteristic of Packet Service Only (PS Only). At this time which characteristic is currently used by the UE and thus whether the UE uses the characteristic of small data transmission is unknown to a network.

In view of the foregoing circumstance, it can be determined, from a request message transmitted from the user equipment, that the user equipment has the characteristic of small data transmission in a preferred embodiment of the invention.

In a specific implementation, an indicator of the characteristic of small data transmission can be carried in an Attach Request message transmitted from the user equipment to indicate that the user equipment has the characteristic of small data transmission; and then it is known from the indicator of the characteristic of small data transmission that the user equipment has the characteristic of small data transmission.

As an implementation scheme, the indicator of the characteristic of small data transmission may include any one or more of the following Information Elements (IEs): a newly added EPS Attach Type, a newly added Request Type or a newly added Access Point Name (APN).

For example, the newly added Request Type can be given a new value MTC-Low-Data-Request so that an MME can determine from the new value that the UE has the characteristic of small data transmission.

As another implementation scheme, the presence of the characteristic of small data transmission can be indicated implicitly to the network in the Attach Request message in which no PDN connection establishment request message is carried.

Typically the UE will transmit a first Non-Access Stratum (NAS) message including two messages to the network in a network attachment procedure, where one is an Attach message and the other is a PDN connection establishment request message (PDN Connectivity Request), and the PDN connection establishment request is carried along with the transmitted Attach message.

In summary the inventors of the invention have innovatively proposed that the user equipment transmits a first NAS message including only one message, i.e., an Attach message, but carrying no PDN connection establishment request message to the network when the UE has the characteristic of small data transmission. Thus the MME can know that the user equipment has the characteristic of small data transmission.

As can be appreciated, those skilled in the art can use the several schemes to determine that the user equipment has the characteristic of small data transmission in combination or use any one of the schemes as needed. Furthermore those skilled in the art can further use other schemes in addition to the foregoing several schemes, and the invention will not be limited in this regard.

The method includes an operation 102 to allocate no user plane resource to the user equipment with the characteristic of small data transmission in a network attachment procedure.

No user plane resource may be allocated to the user equipment at the network side upon knowledge of that the user equipment has the characteristic of small data transmission for the purpose of saving a network resource.

The invention may provide the following schemes to allocate no user plane resource to the user equipment:

First Scheme

No PDN connection is established for the user equipment with the characteristic of small data transmission in the network attachment procedure.

In practice, the MME can skip the operation of setting up a PDN connection in the existing network attachment procedure if the MME knows that the user equipment has the characteristic of small data transmission. Since no PDN connection is established, no user plane resource will be allocated to the user equipment, and thus a user plane network resource can be saved and also a signalling resource used for a PDN connection can be saved.

Second Scheme

A PDN connection, to which no user plane resource is required to be allocated, is established for the user equipment in the network attachment procedure.

This scheme may be performed in the following sub-operations:

A sub-operation A1 is to transmit from the MME a Create Session Request message carrying an indicator of no bearer being required to be established to instruct a Serving Gateway (SGW) and a Packet Data Gateway (PGW) to allocate a null resource to a PDN connection; and Upon knowledge of that the user equipment has the characteristic of small data transmission, the MME stills performs a PDN connection establishment procedure and carries the indicator of no bearer being required to be established in a relevant Create Session Request message to indicate that no resource for transmission of data is required to be reserved for the PDN connection.

In a sub-operation A2, the SGW and the PGW allocate a null resource to the PDN connection according to the indicator of no bearer being required to be established.

In a subsequent PDN connection establishment procedure, the SGW, the PGW (Packet Data Network-Gateway) and other network nodes may perform a necessary process according to this indicator but will not reserve for the PDN establishment any resource for transmission of user plane data. The sub-operation A2 may particularly include:

An operation A21, the SGW receives the Create Session Request message transmitted from the MME, allocates a null resource to the PDN connection according to the indicator of no bearer being required to be established in the message and transmits a corresponding Create Session Request message to the PGW while carrying the indicator of no bearer being required to be established in the corresponding message;

An operation A22, the PGW allocates a null resource to the PDN connection according to the Create Session Request message received from the SGW and returns a corresponding Create Session Response message to the SGW; and An operation A23, the SGW returns a corresponding Create Session Response message to the MME according to the Create Session Response message from the PGW.

In the foregoing operations, the MME, the SGW and the PGW will create information of a context for the PDN connection and allocate a resource according to an existing solution. However in the method according to the invention, it is not necessary to establish a bearer-related resource for the UE, so it is only necessary to identify that no resource required for the PDN connection is allocated to the UE. One approach is to create no context of the PDN connection but to include a flag to indicate that no PDN connection is established for the UE, and another approach is to create a context of the PDN connection but also indicate that this context is a null context, that is, all the entries in the context are null, to thereby indicate that a null resource is allocated for the PDN connection. This method will not preclude other approaches for identifying that a network node allocates no resource to the UE.

As can be appreciated, those skilled in the art can use the foregoing two schemes in combination or use any one of the schemes as needed, and the invention will not be limited in this regard. For example, only the MME will be modified in behavior to perform the first scheme at the network side, but the SGW and the PGW will further be modified in behavior to perform the second scheme, so the first scheme will be adopted to save the behavior modification.

A large number of user equipments will have the characteristic of small data transmission for the purpose of an optimized network in 3GPP M2M communication, and since the invention will not allocate any user plane resource to the large number of user equipments, user plane resources can be saved significantly, and thus a larger number of user equipments can be enable to access the network.

Since no PDN connection is established in the first scheme and no user plane resource is allocated for a PDN connection, it is not necessary to allocate any user plane resource to the PDN connection at the network side. Thus in a preferred embodiment of the invention, an indicator of a null resource corresponding to the user equipment can be carried in an Initial Context Setup Request message transmitted from the MME to an eNB to instruct the eNB not to allocate any user plane resource to the user equipment.

In a specific implementation, for an E-UTRAN Radio Access Bearer to Be Setup List (E-RAB to Be Setup List) of the Initial Context Setup Request message:

a) an indicator of a "Null Resource" can be defined in the list, and thus the eNB will not establish any radio resource; for example, a special E-RAB ID can be defined, and the eNB will understand that no user plane resource is required to be established if the E-RAB ID takes the value of 0.

b) the list can be set to include no item Information Element (IE) of any E-RAB to Be Setup, and at this time, the eNB can also understand that no user plane resource is required to be established.

Of course, those skilled in the art can further define other indicator of a null resource or include a defined indicator of a null resource in an Attach Accept message under practical circumstances, and the invention will not be limited in this regard.

In the prior art, if the UE moves from an old location to a new location (for example, the UE moves out of a location area where it is registered) after the UE is attached to the network, then its mobility management entity will possibly be changed from an old MME to a new MME and a Track Area Update (TAU) procedure will be triggered. A TAU procedure in the case that no PDN connection is established in the invention will be described blow.

In another preferred embodiment of the invention, the method for saving a network resource may further include:

the MME makes a record corresponding to bearer allocation to the user equipment in the context of the UE upon reception of an Update Location Request message from a Home Subscriber Server (HSS).

In practice, the record can be made according to the type of bearer allocation to the user equipment.

The following process is performed for the type of no PDN connection to be established:

at this time, no context of any PDN connection is created and only a mobility management context is preserved, in a context of the UE; or a flag bit, e.g., the existing flag of the small data attribute or a flag of whether to establish a PDN connection, is included in the context of the UE and is set. Thus a new MME can know form the context of the UE that the old MME sets up no PDN connection for the UE.

The following process is performed for the type of a PDN connection to be established to which no user plane resource is required to be allocated:

at this time, a flag bit, e.g., the No-EPS-Bearer-Established-Flag, can be included in the context of the UE and can be set. Thus the new MME can know form the context of the UE that the old MME sets up no bearer for the UE although it sets up a PDN connection for the UE.

Information of the record can be transferred from the old MME to the new MME in the TAU procedure, and then, the new MME can perform the PDN connection and TAU procedure of the UE according to the context of the UE from the old MME.

Figure 2:
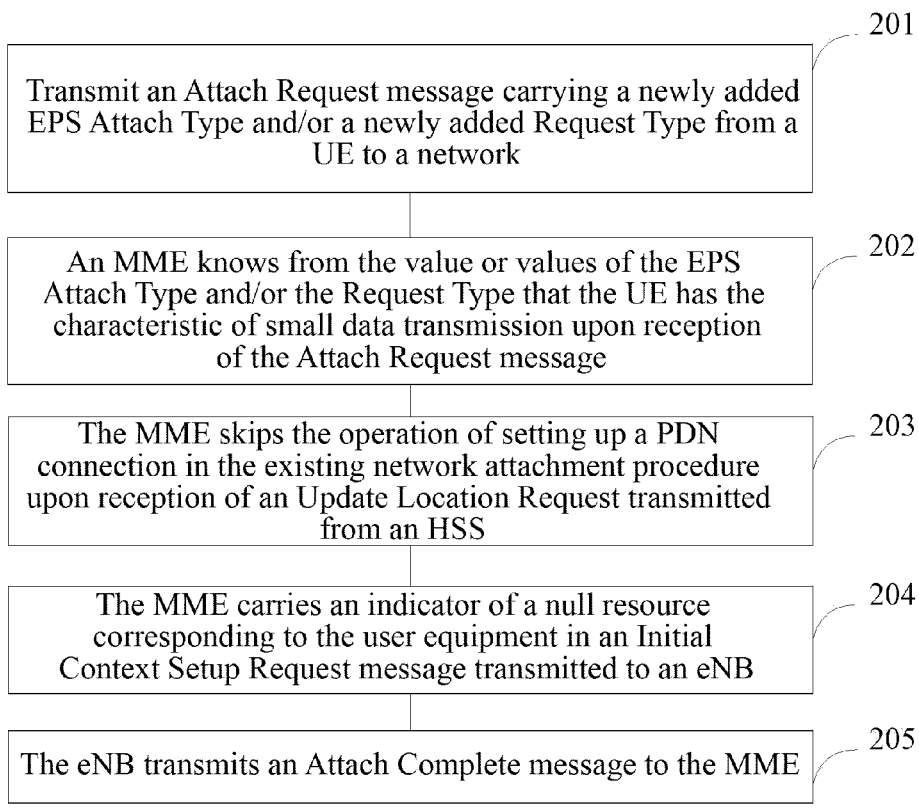
FIG. 2 is a flow chart of a second embodiment of a method for saving a network resource according to the invention.

Embodiments of the foregoing solution will be provided below to make those skilled in the art better understand the invention:

Referring to FIG. 2 illustrating a flow chart of a second embodiment of a method for saving a network resource according to the invention, the method may particularly includes:

Operation 201, an Attach Request message carrying a newly added EPS Attach Type and/or a newly added Request Type is transmitted from a UE to a network;

Referring to Table 1, the EPS Attach Type can be encoded with one byte in an application instance of the invention, where the value of the EPS Attach Type is represented in lower three bits (321). Referring to Table 2, the newly added MTC-Low-Data Attach can be represented as 101 in an embodiment of the invention.

TABLE 1

| 8 | 7 | 6 | 5 | 4 | 3 | 2 | 1 | |
|---|---|---|---|---|---|---|---|---|
| Information Element of EPS Attach Type | | | | 0 | Value of EPS Attach Type | | | 1 byte |

TABLE 2

| 3 | 2 | 1 | |
|---|---|---|---|
| 0 | 0 | 1 | EPS Attach |
| 0 | 1 | 0 | Combined EPS/International Mobile Subscriber Identity (IMSI) Attach |
| 1 | 1 | 0 | EPS Emergency Attach |
| 1 | 0 | 1 | MTC-LOW-DATA ATTACH |
| 1 | 1 | 1 | Reserved |

Referring to Table 3, the Request Type can be encoded with one byte in another application instance of the invention, where the value of the Request Type is represented in lower three bits (321). Referring to Table 4, the newly added MTC-Low-Data Request can be represented as 101 in an embodiment of the invention.

TABLE 3

| 8 | 7 | 6 | 5 | 4 | 3 | 2 | 1 | |
|---|---|---|---|---|---|---|---|---|
| Information Element of Request Type | | | | 0 | Value of Request Type | | | 1 byte |

TABLE 4

| 3 | 2 | 1 | |
|---|---|---|---|
| 0 | 0 | 1 | Initial Request |
| 0 | 1 | 0 | Handover |
| 0 | 1 | 0 | Unused |
| 1 | 0 | 1 | MTC-LOW-DATA REQUEST |
| 1 | 0 | 0 | Emergency |

As can be appreciated, those skilled in the art can select any one or combination of the foregoing two newly added types as needed in practice.

For example, if the UE transmits small data in a short message, then the value of the EPS Attach Type can be set to Combined EPS/IMSI Attach and the value of the Request Type can be set to MTC-Low-Data Request.

In another example, if the UE transmits small data on a signalling connection of an EPS system instead of transmitting the small data in a short message, then the value of the Request Type shall be set to MTC-Low-Data Request. At this time, the value of the EPS Attach Type can be set to MTC-Low-Data Attach.

Operation 202, an MME knows from the value or values of the EPS Attach Type and/or the Request Type that the UE has the characteristic of small data transmission upon reception of the Attach Request message;

Operation 203, the MME skips the operation of setting up a PDN connection in the existing network attachment procedure upon reception of an Update Location Request transmitted from an HSS;

Operation 204, the MME carries an indicator of a null resource corresponding to the user equipment in an Initial Context Setup Request message transmitted to an eNB; and Operation 205, the eNB allocates no user plane resource to the user equipment and transmits an Attach Complete message to the MME.

The operation of setting up a PDN connection and the operation of updating a bearer of the network to which the UE is attached in the existing network attachment procedure are omitted in this embodiment, and thus a signalling resource in addition to a user plane resource can be further saved.

In the prior art, a Tracking Area Update (TAU) procedure will be triggered if the UE moves from an old MME to a new MME after the UE is attached to the network, and a TAU procedure in the case that no PDN connection is established in the invention will be described below.

In a preferred embodiment of the invention, the method for saving a network resource may further include:

Operation B1, the MME makes a record corresponding to bearer allocation to the user equipment in a context of the UE upon reception of an Update Location Request message from the HSS;

Operation B2, the old MME returns the corresponding context of the UE upon reception of a Context Request message of the UE from the new MME; and Operation B3, the new MME determines from the corresponding record in the context of the UE that the old MME establishes no PDN connection for the UE and then skips TAU and PDN connection processes of the UE.

Since the TAU and PDN connection processes of the UE can be skipped according to information of the record, a signalling resource in the TAU procedure can be saved.

It shall be noted that this preferred embodiment will not be limited to the second embodiment but can be applicable to any network attachment, TAU and other procedures in the case that no PDN connection is established.

Figure 3:
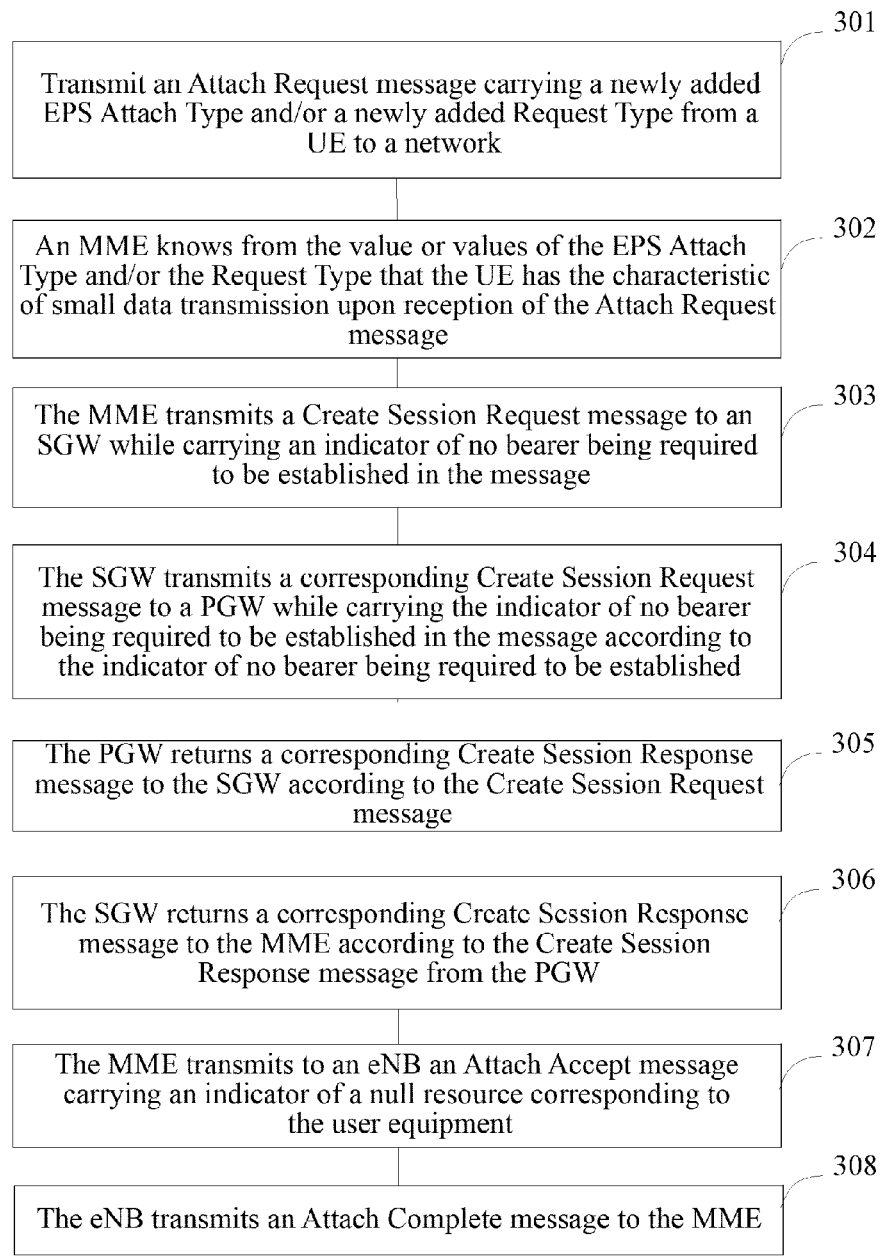
FIG. 3 is a flow chart of a third embodiment of a method for saving a network resource according to the invention.

Referring to FIG. 3 illustrating a flow chart of a third embodiment of method for saving a network resource, the method may particularly include:

Operation 301, an Attach Request message carrying a newly added EPS Attach Type and/or a newly added Request Type is transmitted from a UE to a network;

Operation 302, an MME knows from the value or values of the EPS Attach Type and/or the Request Type that the UE has the characteristic of small data transmission upon reception of the Attach Request message;

Operation 303, the MME transmits a Create Session Request message to an SGW while carrying an indicator of no bearer being required to be established in the message;

In an application instance of the invention, the indicator of no bearer being required to be established can be filled into the information element of Indication Flags in the Create Session Request message; for example, an indicator No_Bearer_Flag can be defined and set to 1 when no bearer is required to be established.

Alternatively in an application instance of the invention, a "Null Resource" can be defined, in the information element of Bearer Context to be created, to specify information on a bearer to be established for the PDN connection. Specifically a "Null Resource" can be represented as a special EPS Bearer ID. For example, the value of the EPS Bearer ID currently ranges from 5 to 15, and thus a "Null Resource" can be represented as any value ranging from 1 to 4.

In this instance, a "Null Resource" can be indicated by modifying other fields, and the invention will not be limited to any specific indicator of a "Null Resource".

Operation 304, the SGW allocates no user plane resource to the UE according to the indicator of no bearer being required to be established and transmits a corresponding Create Session Request message to a PGW while carrying the indicator of no bearer being required to be established in the message.

Since it is not necessary for the SGW to allocate any resource to the UE, the SGW can set the Serving GW Address for the User Plane, the Serving GW TEID of the User Plane and the EPS Bearer Identity, in the Create Session Request message transmitted from the SGW to the PGW, to special values, for example, these values may not point to any resource or they may point to a null resource. Specifically the Serving GW Address for the User Plane can be set to 0.0.0.0; the Serving GW TEID of the User Plane can be set to 0; and the EPS Bearer Identity can be set to a special value (e.g., 0). Also the SGW will further transmit the received indicator of no bearer being required to be established (e.g., No PDN Flag) as well to the PGW.

Operation 305, the PGW allocates no user plane resource to the UE according to the Create Session Request message and returns a corresponding Create Session Response message to the SGW.

The PGW determines from the received message that no user plane resource is required to be established for the UE and thus will set correspondingly the Create Session Response message returned to the SGW. Specifically, the PDN GW Address for the User Plane can be set to 0.0.0.0, and the PDG GW TEID of the User Plane can be set to 0.

At this time, no user plane resource is established, so the other relevant parameters, e.g., the EPS Bearer Quality of Service (QoS), the Protocol Configuration Options, the Payload Compression, the APN Restriction, etc., may not be set anyway; and furthermore it is not necessary for the PGW to take into account the parameters of PDN Type, Dual Address Bearer Flag, etc., in the message.

Operation 306, the SGW returns a corresponding Create Session Response message to the MME according to the Create Session Response message from the PGW;

The SGW shall return a Create Session Response message to the MME upon reception of the message from the PGW. Since no user plane resource is required to be established, parameters in the Create Session Response message can be set as follows: the Serving GW Address for User Plane can be set to 0.0.0.0, the Serving GW TEID for S1-U User Plane can be set to 0, etc., and a repeated description thereof will be omitted here. As can be appreciated, the MME can update bearer information in a context of the UE according to such information.

Operation 307, the MME transmits to an eNB an Attach Accept message carrying an indicator of a null resource corresponding to the user equipment; and Operation 308, the eNB allocates no user plane resource to the UE according to the indicator of a null resource and transmits an Attach Complete message to the MME.

In this embodiment, it is not necessary to perform the operation of updating a bearer of the attached-to network because no bearer is established for the UE.

In a preferred embodiment of the invention, the method for saving a network resource may further include:

Operation C1, the MME makes a record corresponding to bearer allocation to the user equipment in the context of the UE upon reception of an Update Location Request message from an HSS;

Operation C2, the old MME returns the corresponding context of the UE upon reception of a Context Request message of the UE from a new MME; and Operation C3, the new MME determines from the corresponding record in the context of the UE that the old MME establishes no bearer for the UE although the old MME establishes the context of a PDN connection for the UE and then can skip a procedure of updating a PDN bearer as in the first scheme or perform a procedure of updating a PDN bearer as in the second scheme but using a null resource as in the scheme while performing the procedure.

It shall be noted that this preferred embodiment will not be limited to the third embodiment but can be applicable to network attachment and TAU procedures in any case that a PDN is established but no bearer is establish for the UE. Furthermore the new MME can perform the PDN connection procedure as in the operation 303 to the operation 306.

Figure 4:
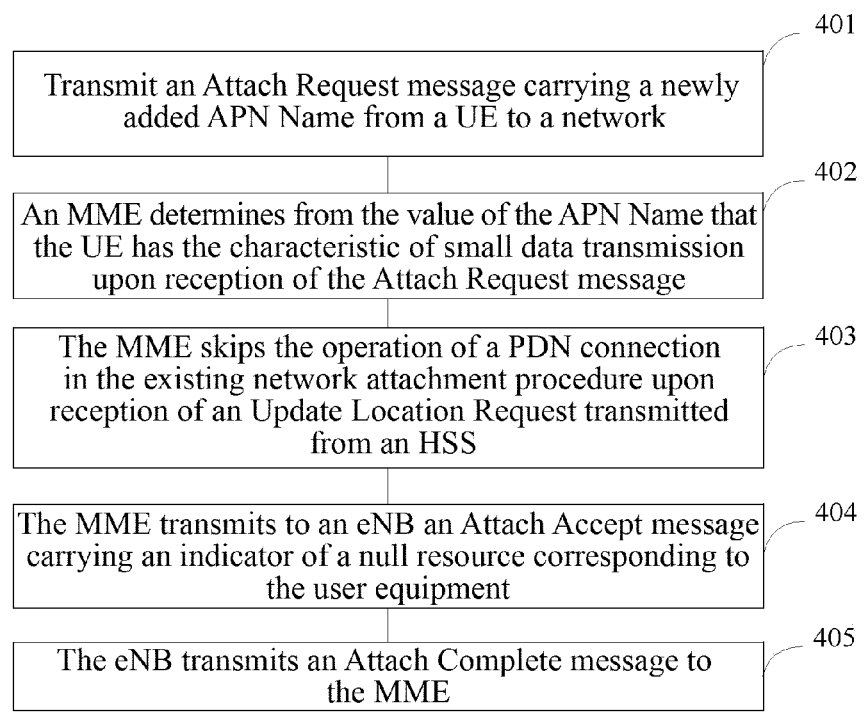
FIG. 4 is a flow chart of a fourth embodiment of a method for saving a network resource according to the invention.

Referring to FIG. 4 illustrating a flow chart of a fourth embodiment of a method for saving a network resource according to the invention, the method may particularly include:

Operation 401, an Attach Request message carrying a newly added APN Name is transmitted from a UE to a network;

An APN shall be carried in the Attach Request message transmitted from the UE to the network to notify the network of a specific PDN to which a PDN connection is to be established. In this embodiment, a special APN is newly added and specially encoded. Thus when an MTC terminal has the characteristic of small data, an MME can know from the newly added special APN that the terminal has the characteristic of small data.

Operation 402, an MME knows from the value of the APN Name that the UE has characteristic of small data transmission upon reception of the Attach Request message;

Operation 403, the MME skips the operation of a PDN connection in the existing network attachment procedure upon reception of an Update Location Request transmitted from an HSS;

Operation 404, the MME transmits to an eNB an Attach Accept message carrying an indicator of a null resource corresponding to the user equipment; and Operation 405, the eNB transmits an Attach Complete message to the MME.

Figure 5:
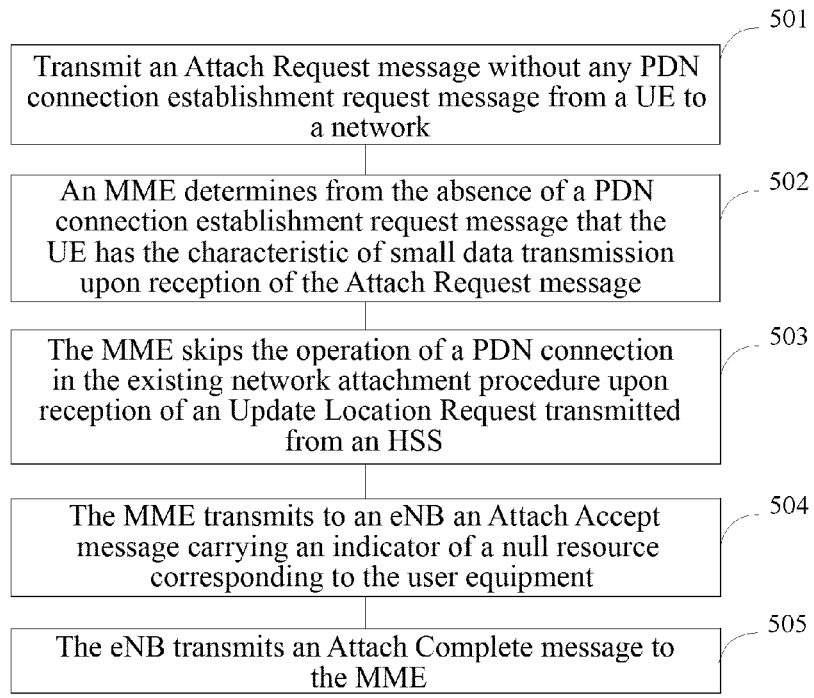
FIG. 5 is a flow chart of a fifth embodiment of a method for saving a network resource according to the invention.

Referring to FIG. 5 illustrating a flow chart of a fifth embodiment of a method for saving network, the method may particularly include:

Operation 501, an Attach Request message without any PDN connection establishment request message is transmitted from a UE to a network;

Operation 502, an MME determines from the absence of a PDN connection establishment request message that the UE has the characteristic of small data transmission upon reception of the Attach Request message;

Operation 503, the MME skips the operation of a PDN connection in the existing network attachment procedure upon reception of an Update Location Request transmitted from an HSS;

Operation 504, the MME transmits to an eNB an Attach Accept message carrying an indicator of a null resource corresponding to the user equipment; and Operation 505, the eNB transmits an Attach Complete message to the MME.

Based upon the same inventive idea, there are further provided in embodiments of the invention an apparatus for saving a network resource, a Serving Gateway (SGW), a Packet Data Gateway (PGW) and an evolved Node B, and since these apparatuses address the problem under a similar principle to the method for saving a network resource, reference can be made to the implementations of the method for implementations of these apparatuses, and a repeated description thereof will be omitted here.

An embodiment of the invention provides an apparatus for saving a network resource, which includes:

an obtaining module configured to determine that a user equipment has the characteristic of small data transmission; and a bearer allocating module configured to allocate no user plane resource to the user equipment with the characteristic of small data transmission in a network attachment procedure;

Furthermore the apparatus for saving a network resource further includes:

a null resource indicator carrying module configured to transmit a message carrying an indicator of a null resource for the user equipment to an eNB to instruct the eNB not to allocate any user plane resource to the user equipment.

Furthermore the apparatus for saving a network resource further includes:

a recording module configured to make a record corresponding to bearer allocation to the user equipment in a context of the user equipment upon reception of an Update Location Request message from an HSS; and an updating module configured to transmit the context of the user equipment to a new MME so that the new MME performs PDN connection and Tracking Area Update (TAU) procedures according to the context of the user equipment.

Preferably the apparatus for saving a network resource is a Mobility Management Entity (MME).

An embodiment of the invention further provides a Serving Gateway (SGW) including:

an indicator receiving module configured to receive an indicator, of no bearer being required to be established, transmitted from a Mobility Management Entity (MME) for a user equipment with the characteristic of small data transmission; and an allocation instructing module configured to allocate a null resource to a Packet Data Network (PDN) connection and to transmit a Create Session Request message, carrying the indicator of no bearer being required to be established, to a Packet Data Gateway (PGW) to instruct the PGW to allocate a null resource to the PDN connection.

An embodiment of the invention further provides a Packet Data Gateway (PGW) including:

an indicator receiving module configured to receive an indicator, of no bearer being required to be established, transmitted from a Serving Gateway (SGW) for a user equipment with the characteristic of small data transmission; and a null resource allocating module configured to allocate a null resource to a Packet Data Network (PDN) connection and to return a Create Session Response message to the SGW.

An embodiment of the invention further provides an evolved Node B including:

an indicator receiving module configured to receive an indicator of a null resource transmitted from a Mobility Management Entity (MME) for a user equipment with the characteristic of small data transmission; and a null resource allocating module configured to allocate no user plane resource to the user equipment.

Figure 6:
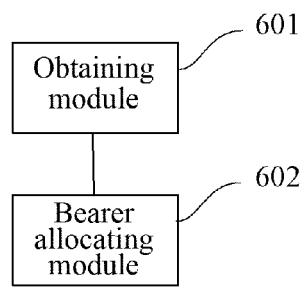
FIG. 6 is a schematic structural diagram of an embodiment of a system for saving a network resource according to the invention.

In correspondence to the foregoing embodiments of the method, the invention further discloses a system for saving a network resource, and referring to FIG. 6, the system may particularly includes:

an obtaining module 601 configured to obtain the characteristic of small data transmission of a user equipment; and a bearer allocating module 602 configured to allocate no user plane resource to the user equipment with the characteristic of small data transmission in a network attachment procedure.

The invention may provide the following two design schemes for the bearer allocating module 602:

First Scheme

A first bearer allocating sub-module D1 can be designed which is configured to establish no PDN connection for the user equipment with the characteristic of small data transmission in the network attachment procedure.

Second Scheme

A second bearer allocating sub-module D2 can be designed which is configured to establish for the user equipment a PDN connection to which no user plane resource is required to be allocated.

Specifically the second bearer allocating sub-module D2 may further include:

a bearer indicator carrying unit D21 configured to carry an indicator of no bearer being required to be established in a Create Session Request message transmitted from a mobility management entity; and an allocating unit D22 configured to allocate a null resource to the PDN connection according to the indicator of no bearer being required to be established;

Preferably in an embodiment of the invention, the allocating unit D22 may further include:

a transmitting sub-unit D221 configured to transmit a corresponding Create Session Request message to a PGW while carrying the indicator of no bearer being required to be established in the message according to the indicator of no bearer being required to be established;

a first returning sub-unit D222 configured to return a corresponding Create Session Response message to a SGW according to the Create Session Request message; and a second returning sub-unit D223 configured to return a corresponding Create Session Response message to the MME according to the Create Session Response message from the PGW.

The invention can provide the following design schemes for the obtaining module 601:

Scheme A

A first obtaining sub-module E1 can be designed in the obtaining module 601 to be configured to obtain the corresponding characteristic of small data transmission from a request of the user equipment;

Preferably the first obtaining sub-module E1 may further include:

an indicator carrying unit E11 configured to carry an indicator of small data transmission in an Attach Request message transmitted from the user equipment; and a knowing unit E12 configured to know from the indicator of small data transmission that the user equipment has the characteristic of small data transmission.

Preferably in an embodiment of the invention, the indicator of small data transmission can include any one or combination of the following information elements: a newly added EPS Attach Type, a newly added Request Type or a newly added Access Point Name; or The Attach Request can be indicated implicitly as an Attach Request for small data transmission by including no PDN connection establishment request message in the Attach Request message.

Scheme B

A second obtaining sub-module E2 can be designed which is configured to know from user subscription data that the user equipment has subscribed for the characteristic of small data transmission.

Since the first bearer allocating sub-module D1 establishes no PDN connection and the second bearer allocating sub-module D2 allocates no user plane resource to a PDN connection, it is not necessary to allocate any user plane resource to the PDN connection at the side of an access network. Thus in a preferred embodiment of the invention, the system may further include:

a null resource indicator carrying module F configured to carry an indicator of a null resource corresponding to the user equipment in an Initial Context Setup Request message transmitted from the MME to an eNB.

In another preferred embodiment of the invention, the system may further include:

a recording module G1 configured for the MME to make a record corresponding to bearer allocation to the user equipment in a context of the user equipment upon reception of an Update Location Request message from an HSS; and an updating module G2 configured to perform corresponding PDN connection and TAU procedures of the user equipment according to the context of the user equipment from the old MME.

Specifically the recording module may include:

a first recording unit H1 configured to create no context of any PDN connection and preserve only mobility management context, in the context of the UE; or a second recording unit H2 configured to include a flag bit in the context of the UE to indicate that no PDN connection is established for the user equipment and to set the flag bit;

or a third recording unit H3 configured to include a flag bit in the context of the UE to indicate that the context of the PDN connection is established but no bearer is established for the user equipment and to set the flag bit.

If the updating module G2 determines from the record that the old MME establishes no PDN connection for the UE, then the TAU and PDN connection procedures of the UE can be skipped directly to thereby further saving a signalling resource in the TAU procedure.

A method and system for saving a network resource according to the invention have been introduced above in details, the principle and the embodiments of the invention have been set forth herein in connection with several instances, and the foregoing embodiments have been described merely for the purpose of facilitating understanding of the inventive method and the core idea thereof; and also those ordinarily skilled in the art can modify the invention in the embodiments and application scope thereof according to the idea of the invention. In summary the disclosure of this specification shall not be construed as limiting the scope of the invention.

The respective embodiments in this specification have been described progressively, and each of the embodiments has been focused upon the difference or differences thereof from the other embodiments, and identical or similar parts between the respective embodiments can apply across the embodiments. The embodiments of the system are substantially the same as those of the method and thus have been described briefly, and reference can be made to the description of the embodiments of the method for relevant details thereof.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

The invention claimed is:

1. A method for saving a network resource, comprising:
determining that a user equipment has a characteristic of small data transmission; and
allocating no user plane resource to the user equipment with the characteristic of small data transmission in a network attachment procedure;
wherein allocating no user plane resource to the user equipment with the characteristic of small data transmission comprises:
establishing for the user equipment with the characteristic of small data transmission a PDN connection to which no user plane resource is required to be allocated;
wherein establishing a PDN connection to which no user plane resource is required to be allocated comprises:
allocating a null resource to the PDN connection and transmitting a Create Session Request message carrying an indicator of no bearer being required to be established to instruct a Serving Gateway, SGW, to allocate a null resource to the PDN connection.

2. The method of claim 1, wherein determining that a user equipment has a characteristic of small data transmission comprises:
   determining from a request message transmitted from the user equipment that the user equipment has the characteristic of small data transmission; or
   determining that the user equipment has the characteristic of small data transmission upon determining from subscription data of the user equipment that the user equipment has subscribed for the characteristic of small data transmission.

3. The method of claim 2, wherein the request message is an Attach Request message; and
   the Attach Request message carries an indicator of the characteristic of small data transmission to indicate that the user equipment has the characteristic of small data transmission; or
   the Attach Request message carries no Packet Data Network, PDN, connection establishment request message to indicate implicitly that the user equipment has the characteristic of small data transmission.

4. The method of claim 3, wherein the indicator of the characteristic of small data transmission includes any one or combination of the following information elements: a newly added EPS Attach Type, a newly added Request Type or a newly added Access Point Name.

5. The method of claim 1, further comprising:
   transmitting a message carrying an indicator of a null resource for the user equipment to an eNB to instruct the eNB not to allocate any user plane resource to the user equipment.

6. The method of claim 1, further comprising:
   making a record corresponding to bearer allocation to the user equipment in a context of the user equipment upon reception of an Update Location Request message transmitted from a Home Subscriber Server, HSS.

7. The method of claim 6, wherein making a record corresponding to bearer allocation to the user equipment in a context of the user equipment comprises:
   creating no context of any PDN connection and preserving a mobility management context, in the context of the user equipment; or
   including a flag bit in the context of the user equipment to indicate that no PDN connection is established for the user equipment and setting the flag bit; or
   including a flag bit in the context of the user equipment to indicate that a PDN connection is established but no bearer is established for the user equipment and setting the flag bit.

8. An apparatus for saving a network resource, comprising:
   an obtaining module configured to determine that a user equipment has a characteristic of small data transmission; and
   an bearer allocating module configured to allocate no user plane resource to the user equipment with the characteristic of small data transmission in a network attachment procedure;
   wherein the bearer allocating module is particularly configured to establishing for the user equipment with the characteristic of small data transmission a PDN connection to which no user plane resource is required to be allocated;
   wherein the bearer allocating module is configured to establish a PDN connection to which no user plane resource is required to be allocated by:
   allocating a null resource to the PDN connection and transmitting a Create Session Request message carrying an indicator of no bearer being required to be established to instruct a Serving Gateway, SGW, to allocate a null resource to the PDN connection.

9. The apparatus of claim 8, wherein the obtaining module is particularly configured to determine from a request message transmitted from the user equipment that the user equipment has the characteristic of small data transmission; or to determine that the user equipment has the characteristic of small data transmission upon determining from subscription data of the user equipment that the user equipment has subscribed for the characteristic of small data transmission.

10. The apparatus of claim 9, wherein the request message is particularly an Attach Request message; and
    the Attach Request message carries an indicator of the characteristic of small data transmission to indicate that the user equipment has the characteristic of small data transmission; or
    the Attach Request message carries no PDN connection establishment request message to indicate implicitly that the user equipment has the characteristic of small data transmission.

11. The apparatus of claim 10, wherein the indicator of the characteristic of small data transmission includes any one or combination of the following information elements: a newly added EPS Attach Type, a newly added Request Type or a newly added Access Point Name.

12. The apparatus of claim 8, further comprising:
    a null resource indicator carrying module configured to transmit a message carrying an indicator of a null resource for the user equipment to an eNB to instruct the eNB not to allocate any user plane resource to the user equipment.

13. The apparatus of claim 8, further comprising:
    a recording module configured to make a record corresponding to bearer allocation to the user equipment in a context of the user equipment upon reception of an Update Location Request message transmitted from an HSS; and
    wherein the recording module is configured to make a record corresponding to bearer allocation to the user equipment in a context of the user equipment by:
    creating no context of any PDN connection and preserving a mobility management context, in the context of the user equipment; or
    including a flag bit in the context of the user equipment to indicate that no PDN connection is established for the user equipment and setting the flag bit; or
    including a flag bit in the context of the user equipment to indicate that a PDN connection is established but no bearer is established for the user equipment and setting the flag bit.

14. The apparatus of claim 8, wherein the apparatus for saving a network resource is a Mobility Management Entity, MME.

* * * * *